(12) United States Patent
Clark et al.

(10) Patent No.: US 9,593,025 B2
(45) Date of Patent: Mar. 14, 2017

(54) WASTEWATER EVAPORATOR

(71) Applicants: Gretchen B. Clark, Gretna, VA (US);
Timothy C. Reynolds, Hurt, VA (US)

(72) Inventors: Gretchen B. Clark, Gretna, VA (US);
Timothy C. Reynolds, Hurt, VA (US)

(*) Notice: Subject to any disclaimer, the term of this patent is extended or adjusted under 35 U.S.C. 154(b) by 845 days.

(21) Appl. No.: 13/910,994

(22) Filed: Jun. 5, 2013

(65) Prior Publication Data
US 2014/0014277 A1  Jan. 16, 2014

Related U.S. Application Data

(60) Provisional application No. 61/671,438, filed on Jul. 13, 2012.

(51) Int. Cl.
| | |
|---|---|
| *C02F 1/04* | (2006.01) |
| *C02F 1/10* | (2006.01) |
| *B01D 1/14* | (2006.01) |
| *B01D 1/00* | (2006.01) |
| *B01D 1/22* | (2006.01) |

(Continued)

(52) U.S. Cl.
CPC ............ *C02F 1/048* (2013.01); *B01D 1/0088* (2013.01); *B01D 1/14* (2013.01); *B01D 1/22* (2013.01); *B01D 1/24* (2013.01); *B01D 3/006* (2013.01); *C02F 1/004* (2013.01); *C02F 1/04* (2013.01); *C02F 1/10* (2013.01); *C02F 2209/42* (2013.01)

(58) Field of Classification Search
CPC .......... B01D 1/0088; B01D 1/14; B01D 1/22; B01D 1/26; B01D 1/221; B01D 1/222; B01D 3/006; C02F 1/04; C02F 1/048; C02F 1/08; C02F 1/10

USPC ................ 159/32, 8, 29, 11.3, 18, 27.3, 900
See application file for complete search history.

(56) References Cited

U.S. PATENT DOCUMENTS

| | | | | |
|---|---|---|---|---|
| 1,001,660 A | * | 8/1911 | Macklind | ................ F26B 17/16 |
| | | | | 159/10 |
| 1,136,933 A | * | 4/1915 | Cameron | .............. F26B 17/003 |
| | | | | 159/16.1 |

(Continued)

FOREIGN PATENT DOCUMENTS

JP     59-156493     9/1984

OTHER PUBLICATIONS

Website, www.wastewaterevaporators.com/, two sheets printed from the Internet on Mar. 15, 2012.

*Primary Examiner* — In Suk Bullock
*Assistant Examiner* — Jonathan Pilcher
(74) *Attorney, Agent, or Firm* — Richard C. Litman

(57) ABSTRACT

The wastewater evaporator provides for effluent evaporation in a septic system to eliminate need for a drain field. The evaporator tank contains a plurality of evaporator trays in a vertical array. Solids settle in the septic tank, and liquid effluent flows from the septic tank to the evaporator tank and cascades sequentially from the uppermost to the lowermost tray. The multiple trays increase the surface area of liquid contained therein, thereby greatly enhancing evaporation. An above-surface air pump and vent may be provided for air flow through the evaporator tank. An ultrasonic generator may be installed in each tray to increase the surface area of the effluent to enhance evaporation. An additional intermediate pump tank may be provided between the septic tank and the evaporator tank to control effluent flow and delivery to the evaporator tank. A sump pump in the pump tank periodically delivers effluent to the evaporator tank.

7 Claims, 2 Drawing Sheets

(51) Int. Cl.
*B01D 1/24* (2006.01)
*B01D 3/00* (2006.01)
*C02F 1/00* (2006.01)

(56) References Cited

U.S. PATENT DOCUMENTS

| | | | | |
|---|---|---|---|---|
| 1,932,405 A | * | 10/1933 | Harris | B01D 1/0017 |
| | | | | 159/28.1 |
| 2,432,887 A | | 12/1947 | Haviland | |
| 2,560,978 A | * | 7/1951 | Persson | B01F 3/04468 |
| | | | | 210/758 |
| 4,606,794 A | | 8/1986 | Wyckoff | |
| 5,094,721 A | * | 3/1992 | Petrek | B01D 1/26 |
| | | | | 159/18 |
| 5,223,129 A | * | 6/1993 | Hsieh | B01D 24/007 |
| | | | | 210/150 |
| 5,378,267 A | * | 1/1995 | Bros | B01D 3/22 |
| | | | | 96/168 |
| 5,401,414 A | * | 3/1995 | Wack | B01D 61/147 |
| | | | | 134/10 |
| 5,958,239 A | | 9/1999 | Sing | |
| 6,974,536 B2 | | 12/2005 | Chaffee | |
| 7,794,596 B2 | | 9/2010 | Patterson | |
| 2003/0234086 A1 | | 12/2003 | Sirbaugh | |
| 2008/0035545 A1 | | 2/2008 | Aumis | |
| 2008/0296215 A1 | * | 12/2008 | Simon | C02F 9/00 |
| | | | | 210/202 |

* cited by examiner

WASTEWATER EVAPORATOR

CROSS-REFERENCE TO RELATED APPLICATION

This application claims the benefit of U.S. Provisional Patent Application Ser. No. 61/671,438, filed Jul. 13, 2012.

BACKGROUND OF THE INVENTION

1. Field of the Invention

The present invention relates generally to water treatment facilities, and particularly to a wastewater evaporator that evaporates wastewater effluent in a septic system to eliminate or minimize the need for an underground drain field.

2. Description of the Related Art

Homes and businesses in many suburban areas and nearly all rural areas are not connected to a sanitary sewer system, but rely upon individual septic tank and drain field systems. Such septic tank and drain field systems collect wastewater in the tank, and effluents drain out into the drain field where it is absorbed and dissipated into the surrounding soil.

Such septic tank and drain field systems work reasonably well, are reasonably economical, and require little maintenance until replacement is needed, generally after many years of service. However, they require soil that is capable of absorbing all of the liquid introduced into the system, which limits the areas where such tank and drain field systems may be installed. Areas with high water tables and very rocky ground with poor absorption are clearly not suited for such systems, which limits the available areas for new home, business, and industrial construction. Government regulations concerning such installations are ever more restrictive as well, and consideration must be given to the need to avoid contamination of well water.

A number of evaporative systems for water treatment have been developed in the past. An example of such is found in Japanese Patent Publication No. 59-156,493, published on Sep. 5, 1984. This reference describes (according to the drawings and English abstract) a sewage system incorporating separate tanks for anaerobic and aerobic bacterial treatment of effluent. The treated effluent is then further pasteurized and pumped into an evaporation tank. An ultrasonic generator is installed upon a float in the tank, to agitate the water surface for greater evaporation.

Thus a wastewater evaporator solving the aforementioned problems is desired.

SUMMARY OF THE INVENTION

The wastewater evaporator includes an evaporator tank having a plurality of shallow, vertically stacked evaporator trays therein. The trays are arranged such that when one tray is nearly full, water flows into an overflow drain to the next tray therebeneath until all trays are filled from the uppermost tray in sequence to the lowermost tray. The multiple trays with their collectively large water surface area provide for greater evaporation than would be provided by a single water surface within the tank. An overflow may be provided to drain excess water from the tank.

Air is introduced into the tank by an air intake manifold at one side or end of the evaporator trays to flow across and between the trays and the surfaces of the water therein. An above-ground air pump or fan may be provided to force air into the tank, and a vent may be located for the escape of the air. Each of the trays may be provided with an ultrasonic generator to agitate the surface of the water therein, thereby increasing the surface area to enhance evaporation.

The evaporator tank receives liquid effluent from a generally conventional septic tank for settling solids. After settling, the liquid effluent flows from the septic tank to a pump tank located between the septic tank and the evaporator tank. The pump tank is used as a holding tank for the liquid effluent to prevent overfilling the evaporator tank. A sump pump or the like is installed in the bottom of the pump tank. The sump pump operates periodically (e.g., once per day) to pump effluent to the trays in the evaporator tank. An alarm system including a water level sensor may be provided for the pump tank to alert personnel of excessively high or low effluent level in the pump tank. The alarm system may be connected to the operation of the pump to activate the pump in the event of high effluent level in the pump tank or to prevent timed pump operation in the event of low effluent level in the pump tank.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The wastewater evaporator is a system for the removal of liquid effluent from a septic system, precluding any requirement for a drain field in the surrounding soil. The wastewater evaporator is suited for installation in areas with high water tables, rocky ground and other areas with poor drainage; areas where contamination of underground water may be a problem; and other areas where septic drain fields are precluded due to laws and/or regulations.

Figure 1:
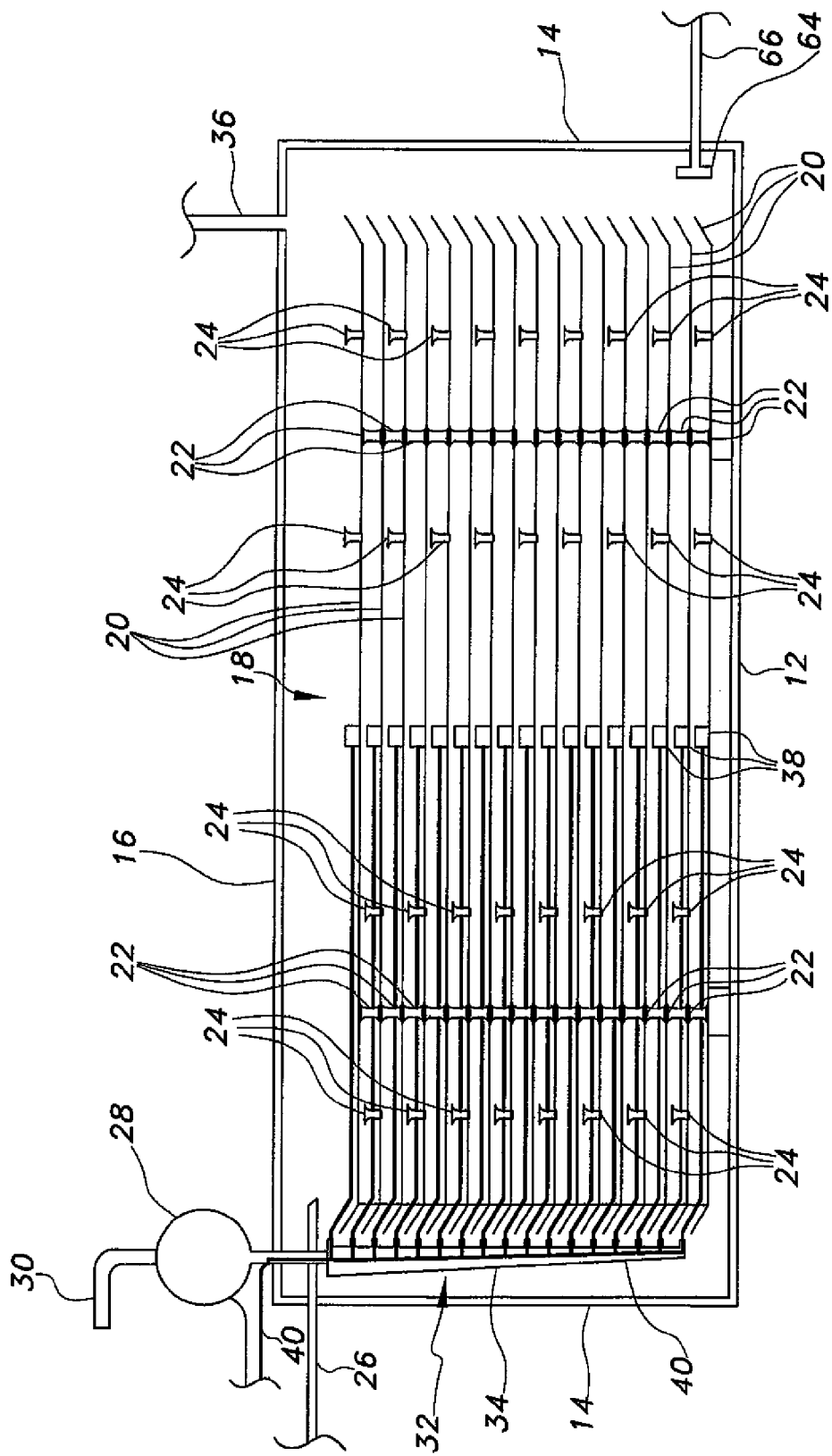
FIG. 1 is a schematic side elevation view of the interior of a wastewater evaporator according to the present invention, illustrating its internal configuration and components.
Figure 2:
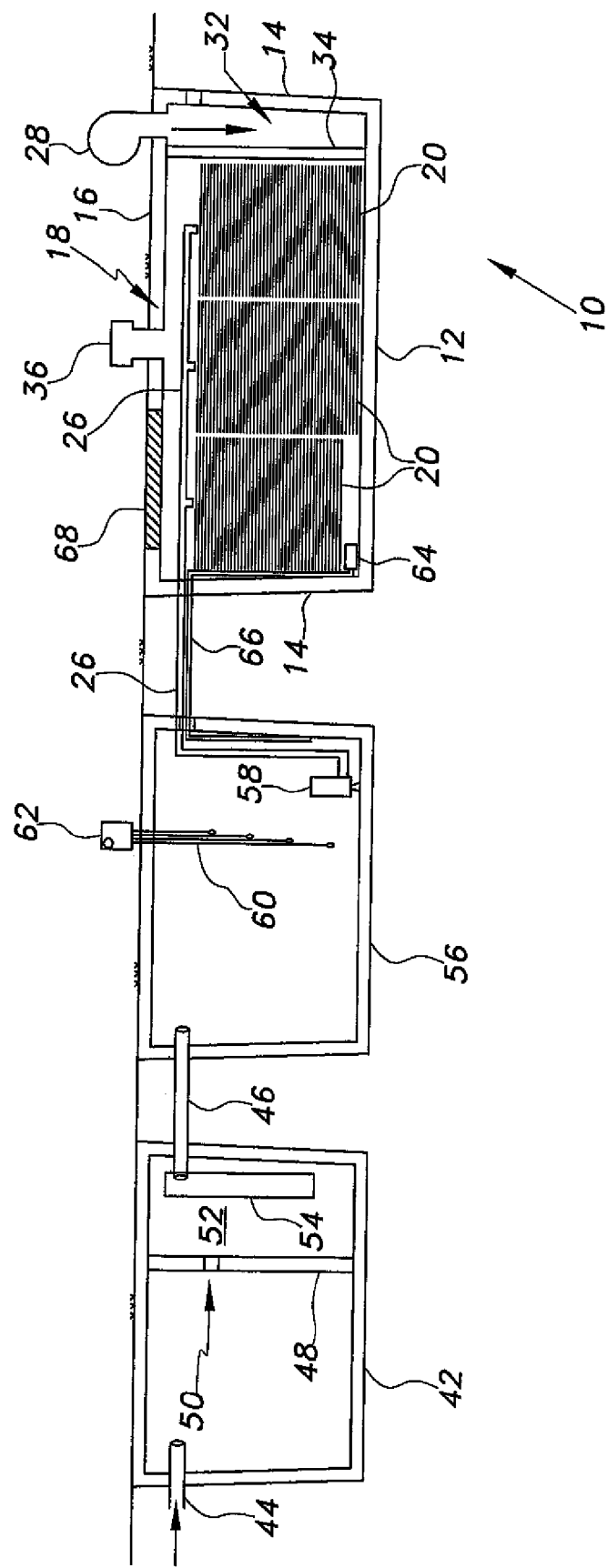
FIG. 2 is a schematic side elevation view of a wastewater evaporator according to the present invention incorporating a septic tank and a pump tank in combination with the evaporator tank of FIG. 1.

The interior of an exemplary evaporator tank 10 of the wastewater evaporator is illustrated as a side elevation view in FIG. 1. The evaporator tank 10 includes a floor 12, walls 14, and a top 16 defining an internal volume 18. The floor, walls, and top are preferably constructed of or lined with liquid impervious or waterproof materials in order to preclude leakage or seepage of effluent from the tank 10. A plurality of wide, shallow evaporator trays 20 are installed within the evaporator tank 10. Each of the evaporator trays 20 may extend throughout the majority of the tank 10, as shown in FIG. 1, or they may comprise smaller units for assembly as a series of separate stacks, as shown in FIG. 2.

Each of the evaporator trays 20 is preferably constructed to be as shallow as practicable in order to provide the greatest number of trays in the vertical array(s) installed within the evaporator tank 10. The trays 20 are spaced apart from one another by spacers 22 to allow a wide but closely spaced horizontal passage between adjacent trays for the flow of air therethrough. Each of the evaporator trays 20 includes at least one (and preferably more) overflow drain(s) 24. The overflow drains extend up from the bottom of each tray 20. This results in the effluent filling each tray 20 to a shallow depth equal to the height of the overflow drain(s) 24. The edges or rims of the trays 20 are slightly higher than their overflow drains 24 in order to assure that effluent will not overflow the edges of the trays 20.

It will be seen in FIG. 1 that the overflow drains 24 are staggered between adjacent trays, e.g., the drains 24 of the uppermost tray 20 are installed in the right side portion of the tray, with the drains 24 of the next lower tray 20 being installed in the left side portion of that tray, etc. Effluent enters the evaporator tank 10 through an inlet pipe or line 26 from the septic tank or other effluent supply line, to flow into the uppermost tray 20. When the effluent reaches a level sufficient to flow into the overflow drains 24 of the uppermost tray, the overflow begins to flow through those drains into the next highest adjacent tray. When the liquid reaches the top of the overflow drains 24 of that next highest adjacent tray, it begins to flow into the next tray below. This process continues with effluent flowing progressively in a cascade from the topmost tray to the lowermost tray and so on to cover the floor 12 of the evaporator tank 10 if sufficient effluent flows into the tank. The large number of evaporator trays 20 multiplies the available effluent surface area by the number of trays, thereby greatly increasing the surface subject to evaporation and correspondingly increasing the rate of evaporation for the effluent in the tank 10.

The rate of evaporation is enhanced by providing a constant supply of air through the evaporator tank 10. This is accomplished by an air pump 28 (electrically powered fan, etc.) installed above the tank 10. Air enters through an inlet 30 and is pumped or blown downward into an air inlet plenum 32 and air inlet manifold 34 installed in one end of the tank 10 adjacent to the evaporator trays 20. Air then passes from the manifold 34 between the trays 20 to evaporate moisture from the trays. Humidified air leaves the evaporator tank 10 through an air outlet vent 36. The vent 36 may be located anywhere on the tank 20, so long as it communicates with the internal volume 18 of the tank 10, but the vent 36 is preferably located at or toward the opposite end of the tank from the air inlet plenum 32 and manifold 34 to facilitate airflow through the assembly.

The above-described system works well to remove liquid effluent from sewage and other wastewater by increasing the surface area of the liquid that is subject to evaporation. The system requires only enough power to drive an air fan or blower to circulate air between the evaporator trays. However, the system is still dependent upon the total surface area of the liquid contained within the tank. The rate of evaporation may be increased further by increasing the available liquid surface area. This may be accomplished by installing an ultrasonic agitator 38 in each of the evaporator trays 20. The agitators 38 serve to agitate and break up the surface of the liquid in each of the trays, thereby increasing the surface area for greater evaporation. Electrical power to drive the ultrasonic agitators 38 is provided by an electrical cable 40 or the like that extends into the tank 20, e.g., down the air passage from the air pump or fan 28 and through the air inlet manifold 34 and lines to the individual ultrasonic agitators 38 in each of the trays 20.

The evaporator tank 10 is installed downstream from a septic tank, to accept the liquid effluent from the septic tank after the solids have settled out in the septic tank. An additional pump tank may be installed between the septic tank and the evaporator tank 10, to better control the inflow of liquid effluent into the evaporator tank 10, FIG. 2 of the drawings provides a schematic view of such a system, including a septic tank 42, a pump tank 56, and an evaporator tank 10. It will be noted that the arrangement of the components in the evaporator tank 10 of FIG. 2 is somewhat different from the exemplary evaporator tank 10 shown in FIG. 1, but both FIG. 1 and FIG. 2 illustrate the various components of the evaporator tank 10 using like reference numerals for like components.

The septic tank 42 of FIG. 2 is generally conventional, having an intake pipe 44 with a liquid effluent drain 46 extending from the tank 42. The septic tank 42 preferably includes a baffle 48 therein to retain solids in a portion of the tank 42, while allowing liquid effluent to pass through a passage 50 in the baffle 48 to a liquid effluent portion 52 of the tank 42. A filter 54 or the like may be installed in the liquid effluent portion 52 of the tank to further restrict the flow of solids from the tank 42 to the liquid effluent drain 46.

The effluent outlet drain line or pipe 46 from the septic tank 42 connects to a pump tank 56 that serves as an intermediate reservoir or holding tank to control flow to the evaporator tank 10. Liquid effluent flows from the liquid effluent portion 52 of the septic tank 42, through the liquid effluent drain 46 extending from the septic tank 42 to the pump tank 56.

Liquid effluent flows from the pump tank 56 to the evaporator tank 10 through the effluent supply line 26 that connects the pump tank 56 to the evaporator tank 10. The effluent level within the pump tank 56 will vary, depending upon output from the septic tank 42 as well as the rate of input and evaporation in the evaporator tank 10. Accordingly, a pump 58 (e.g., sump pump, etc.) is installed in the pump tank 56 to supply liquid effluent to the evaporator tank 10 periodically through the effluent supply line 26. Generally, the pump 58 may be operated on a timed basis, e.g., once every twenty-four hours or so, to substantially empty the pump tank 56 of accumulated effluent and "dose" the trays 20 of the evaporator tank 10.

However, the pump 58 may be actuated by some other means, e.g., a liquid effluent level sensor 60. The effluent level sensor 60 may be of any conventional principle of operation, e.g., a float system, capacitance system, pressure transducer at the bottom of the tank, etc. The level sensor 60 may be connected to an above-surface alarm device 62 to alert personnel in the event that the effluent level reaches too high a level in the pump tank 56. The alarm 62 may be an audible and/or visual device, and may be contained in a control station or other structure. The level sensor 60 may also operate to prevent actuation of the pump 58 during its regular timed schedule of operation in the event that insufficient effluent has collected in the pump tank 56.

Liquid effluent flows from the pump tank 56 into the evaporator tank 10 through the effluent supply line 26 extending between the pump tank 56 and the evaporator tank 10, as described further above. The evaporator trays 20 fill in a cascade from top tray to bottom tray, as described further above. Any additional effluent flowing into the evaporator tank 10 will cause the lowermost tray 20 to overflow into the bottom of the evaporator tank 10. Accordingly, a return pump 64, e.g., sump pump, etc., is preferably provided in the bottom of the evaporator tank 10 to return excess effluent to the pump tank 56 through a return line 66. An access hatch 68 may be provided in the top of the evaporator tank 10 to provide access to the interior 18 of the tank 12 as needed, e.g., servicing or replacement of the return pump 64, etc. The access hatch 68 is normally sealed in place in the top of the evaporator tank 10 until access is needed to the interior of the tank 10. A similar access hatch (not shown) may be installed in the top of the pump tank 56.

Accordingly, the evaporator tank and septic system therewith provide for the installation of such systems where dispersal of effluent into the ground is not feasible due to physical conditions and/or governmental regulations. The water of the effluent is evaporated from the evaporator trays within the evaporator tank and thence expelled from the evaporator tank to the atmosphere as humidified air, rather than flowing into the surrounding soil as in a conventional septic system. The resulting elimination of ground pollution greatly expands the potential locations for installation of such a system, thus permitting the construction of residences and businesses in locations where they were not previously feasible due to the prohibitive costs of a dedicated sewer system.

It is to be understood that the present invention is not limited to the embodiments described above, but encompasses any and all embodiments within the scope of the following claims.

We claim:

1. A wastewater evaporator for the evaporation of liquid effluent from a septic system, comprising:
    an evaporator tank having an internal volume;
    a plurality of evaporator trays disposed within the evaporator tank, the evaporator trays being spaced apart from one another in a vertical array, the array having an uppermost tray, a lowermost tray, and at least one intermediate tray disposed between the uppermost tray and the lowermost tray, wherein each of the evaporator trays has a right side portion and a left side portion;
    each of the plurality of evaporator trays consisting of an overflow drain disposed in each of the evaporator trays, the overflow drains each having an outlet positioned to discharge effluent into the next lower tray in the vertical array, wherein the overflow drains are staggered between those in the right side portion to those in the left side portion whereby the effluent flows through the overflow drains from an uppermost tray sequentially to each successive intermediate tray in a serpentine configuration, and then to the lowermost tray, further wherein at least one of the evaporator trays includes an ultrasonic agitator;
    an air intake plenum disposed in the evaporator tank adjacent the evaporator trays;
    an air intake manifold disposed in the plenum, the manifold being disposed to direct a flow of air directly over each of the trays in the vertical array such that the flow of air passes across and between each of the trays and the surfaces of the effluent therein thereby evaporating the liquid effluent;
    an air pump disposed above the plenum and manifold, the air pump being adapted to deliver an airflow through the plenum and manifold over each of the evaporator trays; and
    an air outlet vent disposed above the evaporator tank to exhaust air from the evaporator tank.

2. The wastewater evaporator according to claim 1, wherein said evaporator tank comprises:
    having a waterproof floor, walls, and top; and
    an access hatch sealingly disposed in the top of said evaporator tank.

3. The wastewater evaporator according to claim 1, further comprising:
    a septic tank;
    a liquid effluent drain extending from the septic tank;
    a pump tank connected to the effluent drain of the septic tank;
    a pump tank drain extending from the pump tank, the evaporator tank being connected to the pump tank drain; and
    a liquid pump disposed within the pump tank, the pump communicating fluidly with the pump tank drain.

4. The wastewater evaporator according to claim 3, further comprising:
    a sump pump disposed within the evaporator tank; and
    a return line extending from the sump pump to the pump tank.

5. The wastewater evaporator according to claim 3, further comprising:
    an effluent level sensor disposed within the pump tank; and
    an alarm connected to the effluent level sensor.

6. The wastewater evaporator according to claim 3, further comprising an effluent filter disposed within the septic tank.

7. A wastewater evaporator for the evaporation of liquid effluent from a septic system, comprising:
    an evaporator tank having a waterproof floor, walls, and a top defining an internal volume;
    an access hatch sealingly disposed in the top of the evaporator tank;
    a plurality of evaporator trays disposed within the evaporator tank, the evaporator trays being spaced apart from one another in a vertical array, the array having an uppermost tray, a lowermost tray, and at least one intermediate tray between the uppermost tray and the lowermost tray, wherein each of the evaporator trays has a right side portion and a left side portion;
    each of the plurality of evaporator trays consisting of an overflow drain disposed in each of the evaporator trays, the overflow drains each having an outlet positioned to discharge effluent into the next lower tray in the vertical array, wherein the overflow drains are staggered between those in the right side portion to those in the left side portion whereby the effluent flows through the overflow drains from an uppermost tray sequentially to each successive intermediate tray in a serpentine configuration, and then to the lowermost tray; and
    means for providing air to circulate within the evaporator tank, wherein the means for providing air to circulate within the evaporator tank further includes means to direct a flow of air directly over each of the trays in the vertical array such that the flow of air passes across and between each of the trays and the surfaces of the effluent therein.

* * * * *